(12) United States Patent  
Gernoth et al.

(10) Patent No.: US 12,394,145 B2  
(45) Date of Patent: Aug. 19, 2025

(54) FEEDBACK USING COVERAGE FOR OBJECT SCANNING

(71) Applicant: Apple Inc., Cupertino, CA (US)

(72) Inventors: Thorsten Gernoth, San Francisco, CA (US); Cheng Lu, Daly City, CA (US); Hao Tang, San Jose, CA (US); Michael P. Johnson, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/945,196

(22) Filed: Sep. 15, 2022

(65) Prior Publication Data

US 2023/0096119 A1     Mar. 30, 2023

Related U.S. Application Data

(60) Provisional application No. 63/247,831, filed on Sep. 24, 2021.

(51) Int. Cl.
*G06T 17/00* (2006.01)
*G06T 7/50* (2017.01)
*G06V 10/60* (2022.01)

(52) U.S. Cl.
CPC ............ *G06T 17/00* (2013.01); *G06T 7/50* (2017.01); *G06V 10/60* (2022.01);
(Continued)

(58) Field of Classification Search
None
See application file for complete search history.

(56) References Cited

U.S. PATENT DOCUMENTS 8,803,958 B2 *   8/2014   Zhang ................... G06V 20/64
                                                                  348/42
9,912,862 B2 *   3/2018   Peruch ................. H04N 13/296
(Continued)

FOREIGN PATENT DOCUMENTS

CN       108286945 A     7/2018
CN       109069132 A     12/2018
(Continued)

OTHER PUBLICATIONS

Korean Intellectual Property Office, Notice of Preliminary Rejection issued Sep. 19, 2023 which pertains to Korean Patent Application 10-2022-0119234. 9 pages.
(Continued)

*Primary Examiner* — Tapas Mazumder
(74) *Attorney, Agent, or Firm* — Thompson Hine LLP

(57) ABSTRACT

Various implementations disclosed herein provide feedback to a user during object scanning based on how well sensor data of the scanned object has been captured. During object scanning a user may move an electronic device with sensors (e.g., cameras, depth sensors, etc.) around an object to capture sensor data for use in generating a final 3D model of the object. Live feedback during the scanning process is enabled by assessing how well the captured sensor data represents different portions of the object. In some implementations, a 3D model is generated, updated, and assessed based on the sensor data live during the scanning process. This live 3D model may be coarser (i.e., having fewer details) than the final 3D model.

22 Claims, 8 Drawing Sheets

(52) U.S. Cl.
CPC ............. *G06T 2207/10024* (2013.01); *G06T 2207/10028* (2013.01); *G06V 2201/07* (2022.01)

(56) References Cited

U.S. PATENT DOCUMENTS

| | | | |
|---|---|---|---|
| 2009/0061381 A1* | 3/2009 | Durbin | ............... A61C 13/0004 |
| | | | 433/213 |
| 2017/0140537 A1 | 5/2017 | Jia et al. | |
| 2017/0161938 A1* | 6/2017 | Imber | ........................ G06T 7/49 |
| 2018/0240244 A1* | 8/2018 | Uyyala | ................... G06T 17/10 |
| 2020/0380705 A1* | 12/2020 | Breininger | .............. G06T 19/20 |
| 2021/0243362 A1* | 8/2021 | Castillo | ................. G06V 10/26 |
| 2021/0264664 A1 | 8/2021 | Saracchini | |
| 2021/0279967 A1 | 9/2021 | Gernoth | |

FOREIGN PATENT DOCUMENTS

| | | |
|---|---|---|
| CN | 110446906 A | 11/2019 |
| CN | 112739974 A | 4/2021 |
| CN | 113315878 A | 8/2021 |
| JP | 2017-096939 B2 | 6/2017 |
| KR | 10-2016-0014585 A | 2/2016 |
| KR | 10-2018-0118782 A | 10/2018 |
| KR | 10-2019-0015608 A | 2/2019 |
| KR | 10-2021-0069653 A | 5/2021 |
| WO | 2013/074937 A1 | 5/2013 |
| WO | 2014/145471 A1 | 9/2014 |
| WO | 2017/153259 A1 | 9/2017 |
| WO | 2020/058758 A1 | 3/2020 |

OTHER PUBLICATIONS

Korean Intellectual Property Office, Notice of Preliminary Rejection (with English translation), Korean Patent Application No. 10-2022-0119234, 9 pages, May 31, 2024.

Intellectual Property India, First Examination Report (with partial English translation), Indian Patent Application No. 202214053485, 7 pages, May 21, 2025.

China National Intellectual Property Administration, Notification of the First Office Action (with English translation), Chinese Patent Application No. 202211161570X, 18 pages, May 22, 2025.

* cited by examiner

FEEDBACK USING COVERAGE FOR OBJECT SCANNING

CROSS-REFERENCE TO RELATED APPLICATIONS

This application claims the benefit of U.S. Provisional Application Ser. No. 63/247,831 filed Sep. 24, 2021, which is incorporated herein in its entirety.

TECHNICAL FIELD

The present disclosure generally relates to electronic devices that use sensors to scan objects to generate three dimensional (3D) models.

BACKGROUND

Existing scanning systems and techniques may be improved with respect to assessing and using the sensor data obtained during scanning processes and providing feedback during the scanning processes used to generate 3D models.

SUMMARY

Various implementations disclosed herein include devices, systems, and methods that provide feedback during object scanning based on assessing how well sensor data represents portions of the scanned object. During object scanning, a user may move an electronic device with sensors (e.g., cameras, depth sensors, etc.) around an object to capture sensor data for use in generating a final 3D model of the object. During the object scanning, a live camera feed may be displayed on the user's device as the user moves around the object capturing the sensor data, e.g., identifying sets of camera images and depth data associated with different viewpoints around the object. Live feedback during the scanning process is enabled by assessing how well the sensor data captured so far during the scanning process represents different portions of the object. In some implementations, a 3D model is generated, updated, and assessed based on the sensor data live during the scanning process. This live 3D model may be coarser (i.e., having fewer details) than the final 3D model that may contain finer details requiring a model generation process that may not be feasibly completed during the live scan. For example, the 3D model may be a coarse, voxel-based representation of the object, e.g., having voxels larger than a threshold size or otherwise of limited complexity sufficient to enable live generation, updating, and assessment during the scanning process. In another example, the live 3D model is as simple as a 3D bounding box of the object.

In some implementations, the relatively coarse 3D model is assessed to determine coverage values identifying which portions of the scanned object have been adequately captured in sensor data and which portions of the scanned object have not been adequately captured in the sensor data for purposes of generating the final 3D model. For example, each voxel of a voxel-based representation may be assigned a coverage value on a scale from 0 to 10, where coverage values greater than 8 correspond to adequate coverage. In another example in which the coarse 3D model is a bounding box of the object, the coverage values may be associated with different parts of the bounding box, which may be used to approximate the coverage of different parts of the objects. The sets of sensor data (e.g., shots of camera images and corresponding depth data) may similarly be assessed in terms of coverage values identifying how well each set of sensor data represents the object.

The coverage values of portions of a coarse 3D model (e.g., a voxel-based representation) and/or coverage values of sets of sensor data (e.g., shots) are used to provide feedback to the user during the scanning process and/or to select which sets of the sensor data will be used in generating the final 3D model. In one example, a device provides a view of the object and/or the coarse 3D model during the scanning process with indications of the coverage of different portions of the object. For example, a heat map overlain on an image of the object or the coarse 3D model may identify the respective coverage values of different portions of the object. In another example, characteristics such as color, brightness, or a glow effect corresponding to different portions of an image of the object or coarse 3D model are adjusted provide indications of the coverage of the different portions of the object. Arrows, text, audio, and other indications may be provided to guide the user to obtain additional sensor data for portions of the object for which coverage is inadequate or low. In another example, an indicator is displayed to identify which portions of an object will be covered based on the device's current sensor data capture position. In another example, a user interacts with an interactive interface, for example, by selecting a portion of the object and receiving guidance on how to position the device to obtain additional sensor data for that portion.

In some implementations, a processor performs a method by executing instructions stored on a computer readable medium. The method acquires sensor data including an image of an object in a physical environment captured via a sensor on the device during a scanning process. The sensor data may include black and white image data, RGB image data, greyscale image data, depth sensor data such as data from a LIDAR sensor, device motion data, ambient light data, and/or processed sensor data such as depth data from a depth sensor that has been densified with additional depth data based on algorithms or machine learning processes.

The method generates at least a portion of a 3D model (e.g., a coarse representation such as a voxel mesh or voxel cloud) of the object based on the sensor data during the scanning process. The 3D model has a plurality of units (e.g., voxels, mesh triangles, point cloud points, etc.).

The method determines coverage of at least a portion of the plurality of units based on the sensor data obtained during the scanning process, wherein the coverage corresponds to an assessment of the at least a portion of the plurality of units. As described above, such coverage may provide an assessment of how well each portion (e.g. voxel, triangle, point, etc.) represents or otherwise provides useful data with respect to generating a final 3D model of the object. In some implementations, coverage is determined based on (a) distance between each of the portions and the sensor(s), (b) the incident angle between the surface normal of each portion and the sensor view, (c) the relationship between each portion and image plane centers in the sensor data, (d) how well the sensor positions corresponding to the sensor data of each portion are distributed, and/or (e) assessing whether and how well each portion is visible in the sensor data.

The method provides feedback during the scanning process based on the determined coverage for the at least a portion of the plurality of units. As described above, such feedback may indicate differences in coverage in different portions of the object, guide the user to obtain additional sensor data, and/or facilitate user interactions through which additional information may be provided to facilitate the scanning process.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
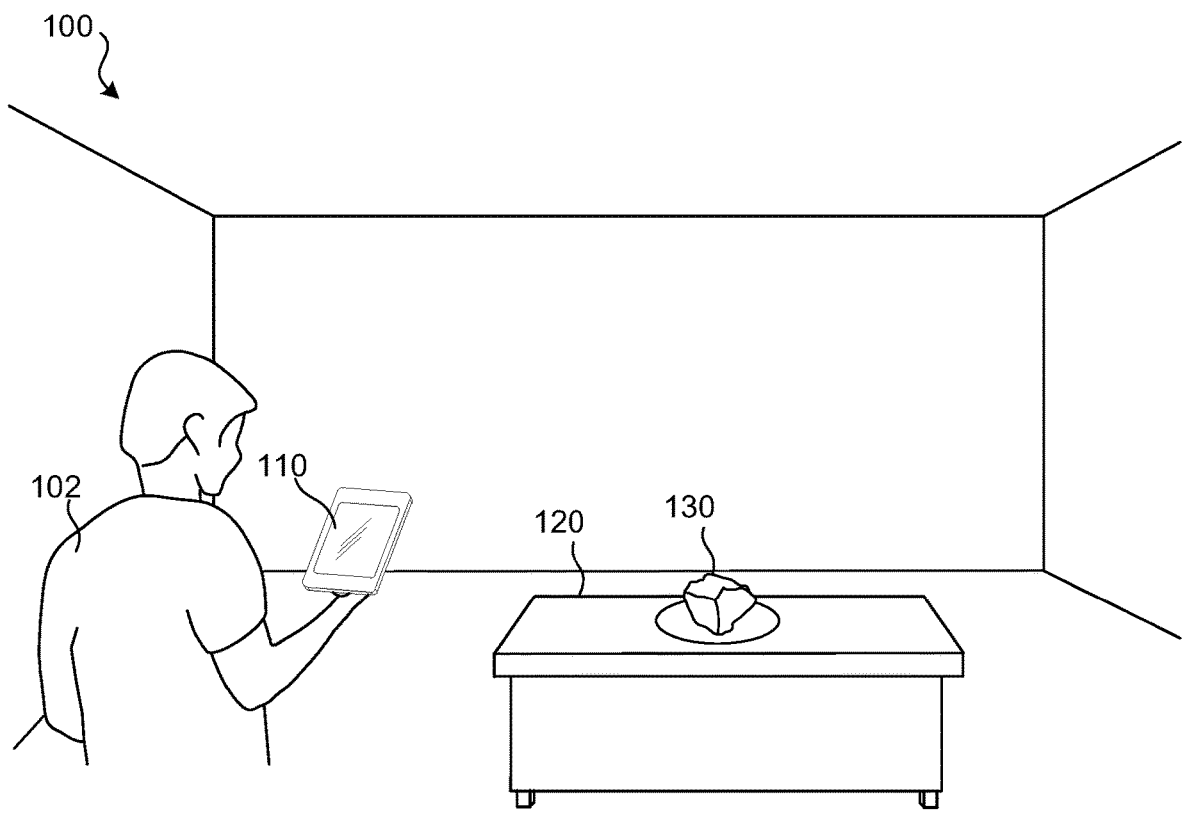
FIG. 1 illustrates an exemplary electronic device operating in a physical environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

FIG. 1 illustrates an exemplary electronic device 110 operating in a physical environment 100. In this example of FIG. 1, the physical environment 100 is a room that includes a desk 120 and an object 130 to be scanned. The electronic device 110 includes one or more cameras, microphones, depth sensors, motion sensors, or other sensors that can be used to capture information about and evaluate the physical environment 100 including the object 130 to be scanned. The obtained sensor data may be used to generate a 3D model (also referred to as a 3D reconstruction) such as a 3D mesh or point cloud of the object 130.

In one example, the user 102 moves around the object 130 within the physical environment 100 and/or moves the device 110 to capture set of sensor data (e.g., shots) from different viewpoints, e.g., at various distances, viewing angles, heights, etc. In another example, the user 102 moves the object during scanning and/or holds the object in hand during the scanning. In another example, the object is positioned on a moving device, such as a turntable, that rotates the object such that the user 102 may remain still during the scanning. These sets of sensor data are then used to generate a final 3D model of the object 130. For example, the sensor data may include a number of RGB images and corresponding depth images with depth values corresponding to some or all of the pixels of the RGB images.

In some scanning processes, the user 102 moves around the object 130 and orients the sensors of the device 110 towards the object 130 to capture the sensor data. During the scanning process, the device 110 may provide information to the user 102 that facilitates the scanning process. For example, the device 110 may provide a view from a camera showing the content of RGB images currently being captured, e.g., a live camera feed. As another example, the device 110 may provide a view of a live 3D model to facilitate the scanning process. Aspects of the live 3D model may be configured to be indicative of portions of the object 130 that have been scanned and the adequacy of the scanning of such portions with respect to generating a final 3D model. The final 3D model may contain finer details or otherwise be more complex than the live 3D model. The final 3D model may require a model generation process that may not be feasibly completed with available processing or other resources to provide a live 3D model. For example, the live 3D model may be a coarse voxel-based representation of the object, e.g., having voxels larger than a threshold size, to enable live generation, updating, and assessment during the scanning process, while the final 3D model may be a dense point cloud representing details of the object at a much finer scale that requires a computationally intensive model generation process.

The live 3D model is assessed to determine coverage values identifying which portions of the scanned object have been adequately captured in sensor data and which portions of the scanned object have not been adequately captured in the sensor data for purposes of generating the final 3D model. The sets of sensor data (e.g., shots of camera images and corresponding depth data) may similarly be assessed in terms of coverage values identifying how well each set of sensor data represents the object. The coverage values are used to provide feedback to the user during the scanning process and/or to select which sets of the sensor data will be used in generating the final 3D model.

Figure 2:
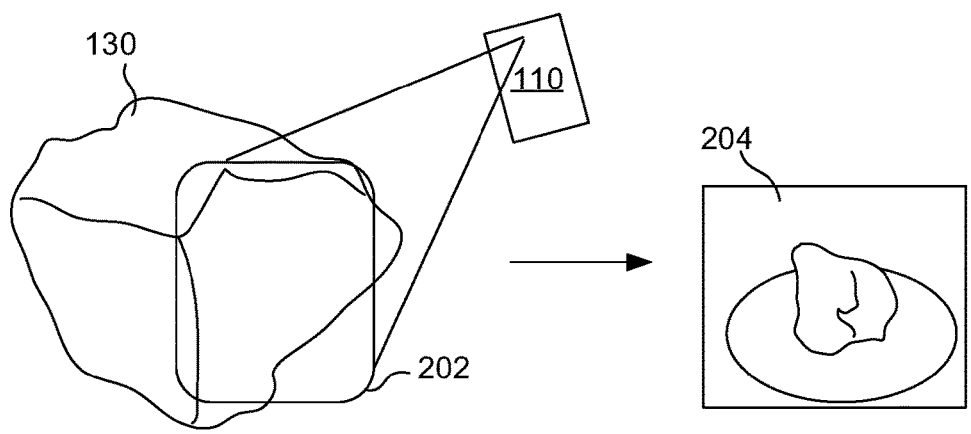
FIG. 2 illustrates evaluating coverage in selecting a set of sensor data for use in generating a final 3D model of a scanned object in accordance with some implementations.

FIG. 2 illustrates evaluating coverage in selecting a set of sensor data 204 for use in generating a final 3D model of a scanned object 130. In this example, the set of sensor data 204 includes an image of the object from a particular viewpoint as well as corresponding depth data from depth sensor. FIG. 2 illustrates that the set of sensor data 204 corresponds to coverage 202 of a portion of the object 130, i.e., the image and corresponding depth data represent the identified portion of the object 130. The coverage may include coverage values identifying how well the set of sensor data 204 represents portions of the object 130. Based on the coverage provided by the set of sensor data 204, the set of sensor data 204 may or may not be selected for use in generating the final 3D model.

During a scanning process, as the user 102 moves the device 110 around the object 130, many sets of sensor data may be captured and considered for possible use in generating a final 3D model. Coverage data associated with each of the sets of sensor data (e.g., a coverage score of each shot) and/or coverage scores determined for individual portions of the 3D object may be used to select sets of sensor data for use in generating the final 3D model. For example, only sets of sensor data with coverage values above a threshold may be selected.

In another example, a number of the obtained sets of sensor data (e.g., 35 of 100) may be selected based on an algorithm or machine learning process that selects a minimum number of sets of sensor data that provide sufficient coverage values for all of the portions of the object 130. Reducing or minimizing the number of sets of sensor data used to generate the final 3D model may make the generation of the final 3D model more efficient and/or effective. Moreover, excluding sets of sensor data that provide poor coverage may improve the quality of the final 3D model that is generated.

Figure 3:
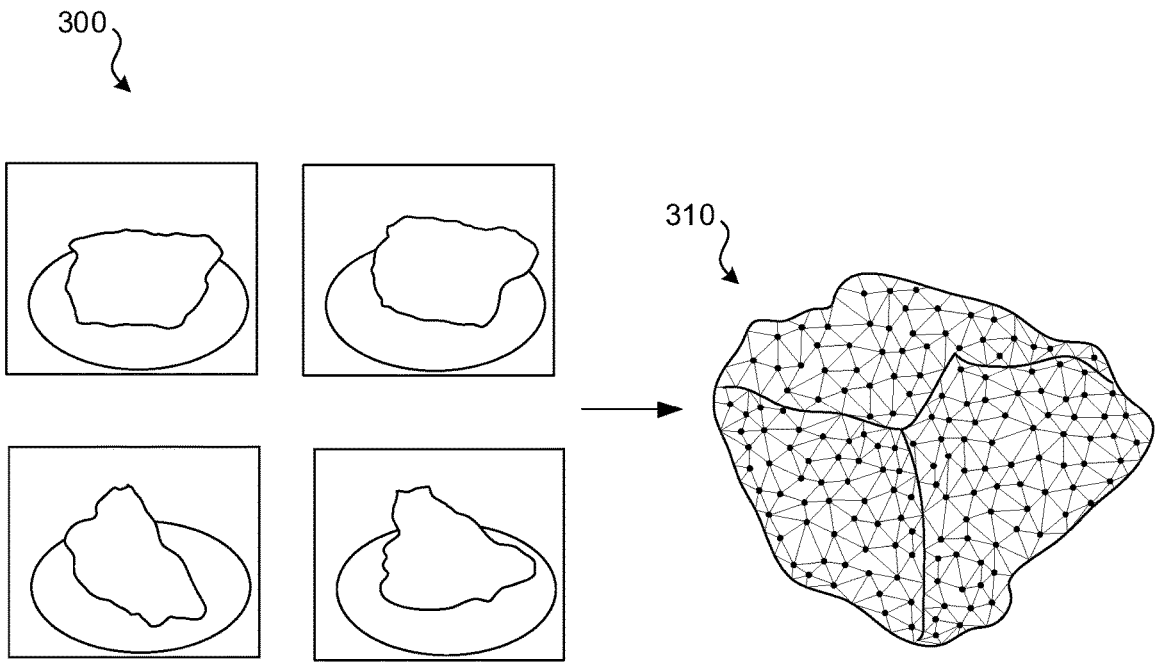
FIG. 3 illustrates using a plurality of selected sets of sensor data to generate a final 3D model of a scanned object in accordance with some implementations.

FIG. 3 illustrates using a plurality of selected sets of sensor data 300 to generate a final 3D model 310 of a scanned object 130. In this example, to simplify the illustration, four sets of sensor data 300 are shown as having been selected and used to generate the final 3D model 310. In practical implementations, the number of selected sets of sensor data may include any number from a single set to hundreds, thousands, or more sets of sensor data. In this example, the final 3D model is depicted as a mesh of nodes forming triangles representing surface areas. These triangles are illustrated as relatively large areas. In practical implementations, the number of triangles may be significantly more (or less) and the triangles (or other shapes of the mesh) may be different in size, e.g., larger or smaller, than those depicted in FIG. 2. Moreover, while the final 3D model 310 is illustrates as a mesh, alternative types of final 3D models may be generated in other implementations, e.g., 3D point clouds, textured 3D geometries, voxel-based representations, etc. In some implementations, a final 3D model includes multiple different types of representations, e.g., points, triangles, planar regions, geometric shapes, etc. A final 3D model 310 may include data that identifies characteristics of the exterior of the object (e.g., color information, texture information, surface normal information, light source information, reflectivity information, opacity information, etc.), the interior of the object 130, and/or other characteristics (e.g., weight, material, semantic labels, etc.) of the object 130.

Figure 4:
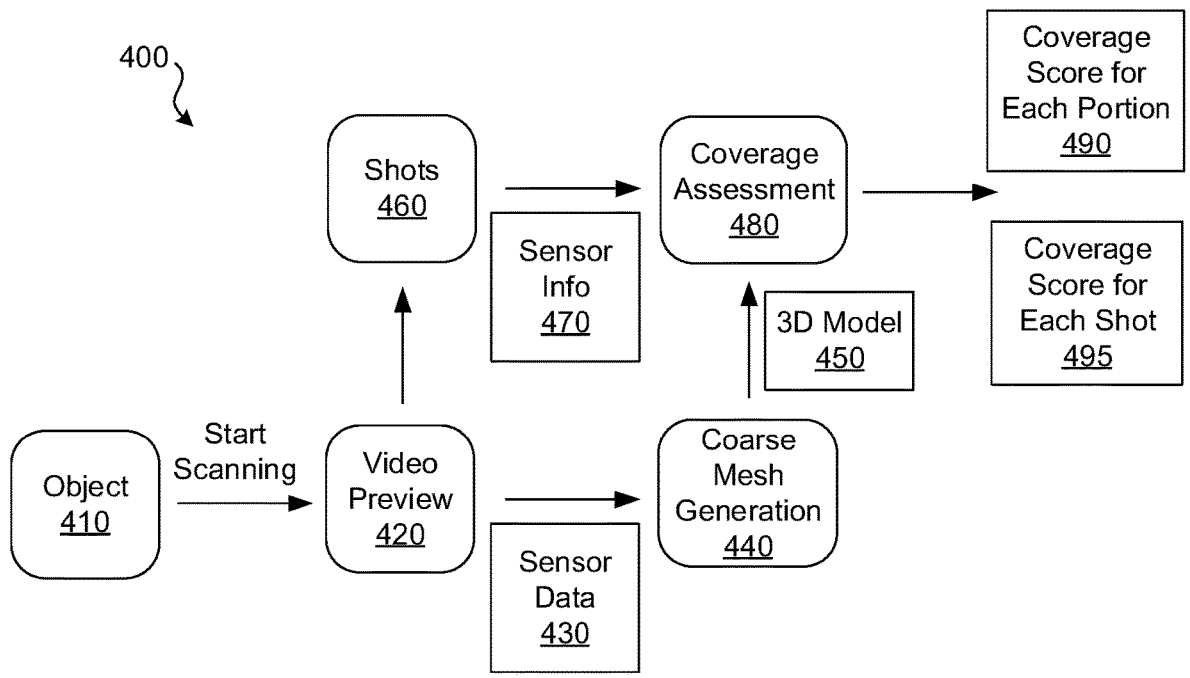
FIG. 4 illustrates an exemplary process for determining coverage in an object scanning process in accordance with some implementations.

FIG. 4 illustrates an exemplary process 400 for determining coverage in an object scanning process. In this example, the process 400 begins with an object 410 being scanned. As described above, a device such as device 110 may be moved around the object 410 while the device 110 captures sensor data. In another example, the device 110 is stationary and the object is rotated and/or moved in view of the device's sensors. During the scanning, a video preview 420 is provided showing pass-through video or other live captured sensor data 430. The sensor data 430 is used in a coarse mesh generation process 440 to generate a 3D model 450. For example, the coarse mesh generation process 440 may include a voxel hashing algorithm used to generate a voxel mesh or voxel cloud representing the object 410. The sensor data 430 is also used to provide sets of sensor data (e.g., shots 460), which may be associated with sensor information 470 (e.g., camera specs, camera pose, etc.). The sensor information 470 and 3D model 450 are provided to the coverage assessment process 480, which produces coverage information, including a coverage score for each portion (e.g., voxel) of the object 490 and a coverage score for each shot 495.

The coverage information may be used to provide various forms of feedback to the user to facilitate and otherwise improve the scanning process. FIGS. 5-8 illustrate various type of exemplary coverage-based feedback provided during a scanning process.

Figure 5:
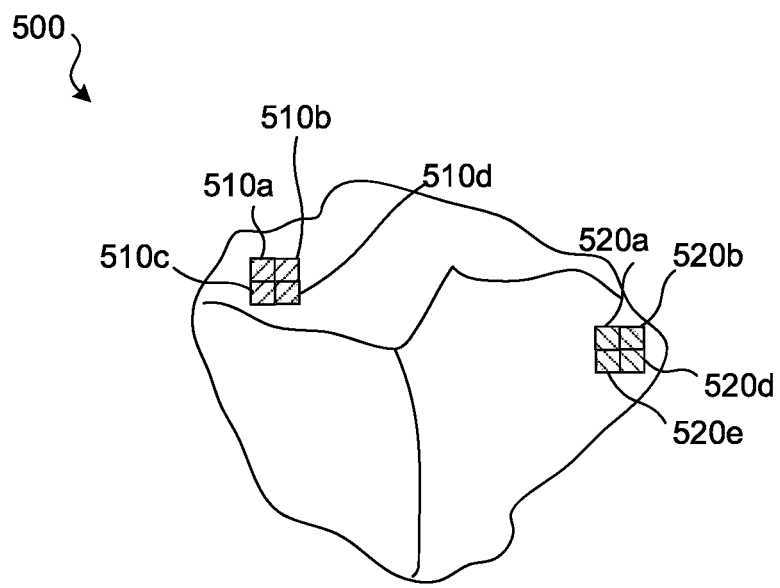
FIG. 5 illustrates an example of coverage-based feedback provided during a scanning process in accordance with some implementations.

In FIG. 5, a representation 500 is provided on a display of a user's device during a scanning process. The representation 500 depicts the object being scanned and/or a live 3D model of the object being scanned. In one example, the representation 500 includes pass-through video images of the object being scanned. In another example, the representation 500 is a view of a live 3D model from a viewpoint, e.g., a viewpoint corresponding to the user's current viewpoint relative to the object. Portions (e.g., voxels, points, etc.) are identified and assessed with respect to coverage. The coverage of these portions is then used to provide feedback to the user. In FIG. 5, the feedback includes depictions 510a-d and depictions 520a-d of portions (e.g., voxels) that have display characteristics (e.g., colors) that identify their corresponding coverage values. In this example, the depictions 510a-d have a first color indicating a relatively low coverage score, while the depictions 520a-d have a second color, different than the first color, indicating a relatively higher coverage score.

In some implementations, more than two colors are used to indicate more than two corresponding coverage scores. In the example of FIG. 5, depictions of only a few exemplary portions (e.g., voxels) of the 3D model are illustrated. In other implementations, all of the portions (e.g., voxels) of the 3D model are depicted using characteristics indicative of their respective coverage values.

In an example in which the representation 500 is an image such as an image in a live video feed, the feedback (i.e., portion depictions 510a-d and depictions 520a-d) may be positioned relative to the image by aligning the image with the 3D model and overlaying the depictions over the corresponding portion of the image. In an example in which the representation 500 is a view of the 3D model itself, the representation may be provided by altering the display characteristics of the portions of the 3D model based on the coverage values and then generating a view from a particular viewpoint.

Figure 6:
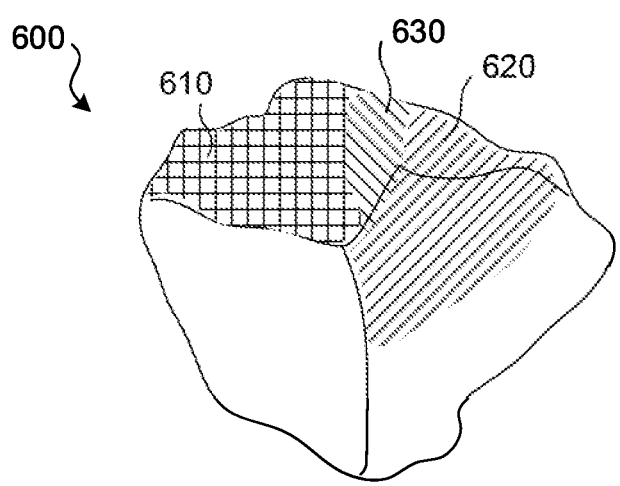
FIG. 6 illustrates another example of coverage-based feedback provided during a scanning process in accordance with some implementations.

FIG. 6 illustrates another example of coverage-based feedback provided during a scanning process. In this example, the representation 600 is provided on a display of a user's device during a scanning process and may include, for example, pass through view images or views of a 3D model as described with respect to FIG. 5. In FIG. 6, the feedback includes depictions 610, 620, 630 of portions (e.g., voxels) that have display characteristics (e.g., brightness, glow effects, etc.) that identify their corresponding coverage values. In this example, the depiction 610 has a first brightness or glow effect type indicating a relatively low coverage score while the depiction 620 have a second brightness or glow effect type, different than the first, indicating a relatively higher coverage score. In some implementations, the feedback shows higher coverage scores for regions that have been captured multiple times (e.g., twice from two different images and perspectives). The overlapping region may have a higher coverage value than other areas that have been captured only once. In FIG. 6, the depiction 630 corresponds a higher coverage score associated with a region that has been captured from two different images and perspectives.

Figure 7:
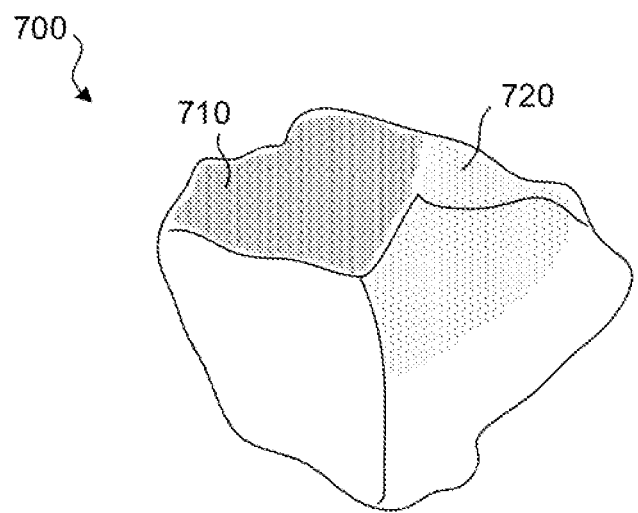
FIG. 7 illustrates another example of coverage-based feedback provided during a scanning process in accordance with some implementations.

FIG. 7 illustrates another example of coverage-based feedback provided during a scanning process. In this example, the representation 700 is provided on a display of a user's device during a scanning process and may include, for example, pass through view images or views of a 3D model as described with respect to FIG. 5. In FIG. 7, the feedback includes depictions 710 and 720 of portions (e.g., points) that have display characteristics that identify their corresponding coverage values. In this example, the depictions 710, 720 provide a "sugar coating" effect on the representation 700 in which each sugar element has a display characteristic (e.g., color, brightness, glow, etc.) corresponding to and thus indicative of its respective coverage score.

Figure 8:
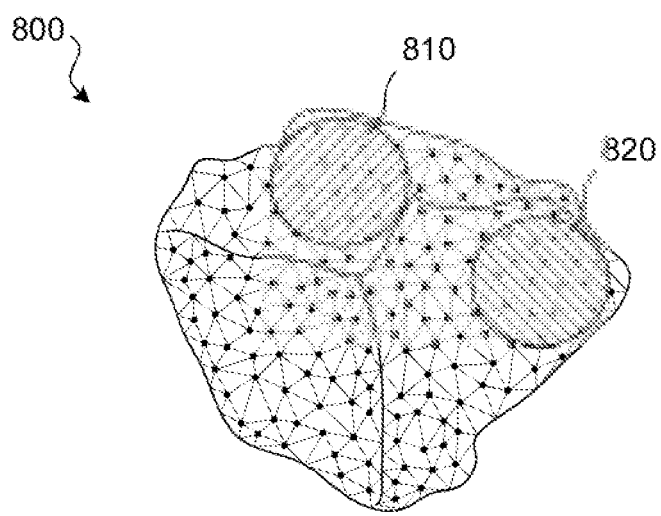
FIG. 8 illustrates another example of coverage-based feedback provided during a scanning process in accordance with some implementations.

FIG. 8 illustrates another example of coverage-based feedback provided during a scanning process. In this example, the representation 800 is provided on a display of a user's device during a scanning process and is a view of a 3D model, e.g., a relatively low-resolution mesh. In FIG. 8, the feedback includes depictions 810 and 820, which are circles that identify portions (e.g., triangles of the mesh) based on their respective coverage values. In this example, the depictions 810, 820 are partially transparent markings that identify portions having low and high coverage, respectively. The portions of the 3D model visible through each depiction 810, 820 correspond to different coverage values, respectively.

Figure 9:
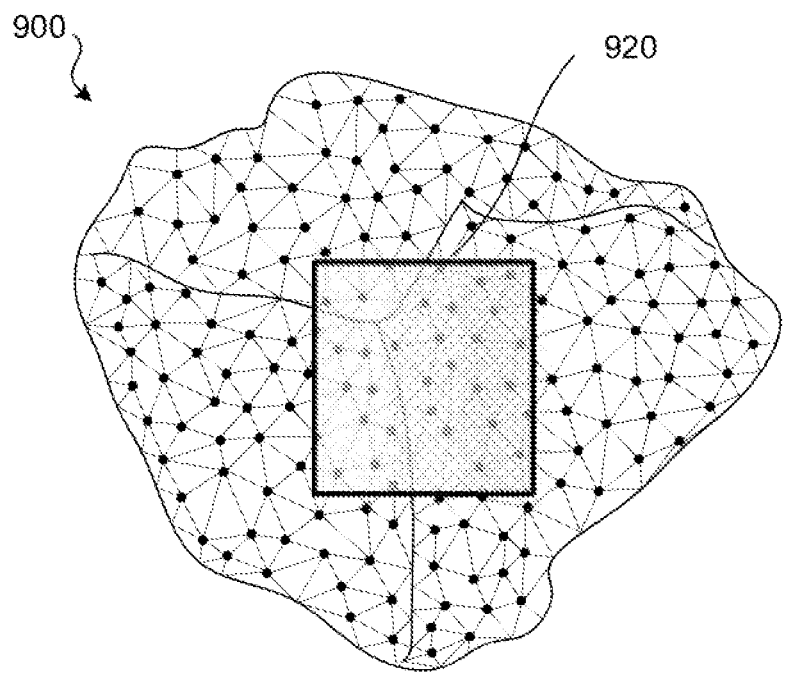
FIG. 9 illustrates an example of a user interaction based on coverage in accordance with some implementations.

FIG. 9 illustrates an example of a user interaction based on coverage. In this example, the representation 900 is provided on a display of a user's device during a scanning process and may include, for example, pass through view of images or views of a 3D model as described with respect to FIG. 5. In this example, the representation 900 is a view of the 3D model. The view includes a graphical indicator 920 that may identify portions of the 3D model and how much sensor data capture by the device 110 from its current position and/or orientation will contribute to coverage if the sensor data is selected (e.g., as a shot for use in generating the final 3D model). The portions of the 3D model visible through the graphical indicator 920 may be altered (e.g., having changed color, brightness, glow, etc.) to indicate how much the sensor data would add to the coverage. This feedback may enable the user to position and orient the device 110 in a way that provides desired increases to the coverage to particular portions of the object and/or to manually select sets of sensor data (e.g., shots to use for the final reconstruction) based on information about how and where each potential shot contributes to the coverage of different portions of the object.

Figure 10:
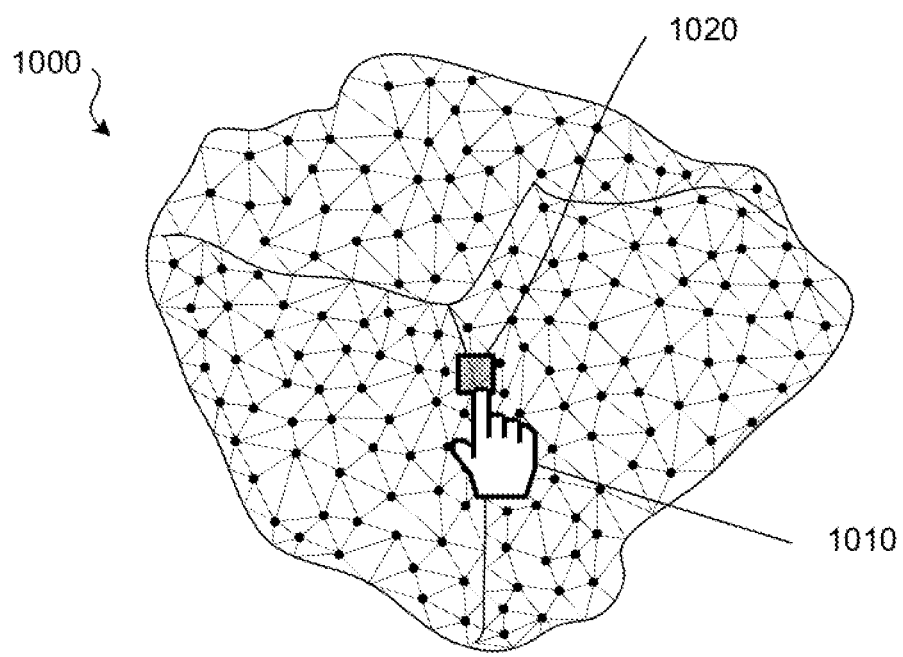
FIG. 10 illustrates another example of a user interaction based on coverage in accordance with some implementations.

FIG. 10 illustrates another example of a user interaction based on coverage. The representation 1000 is provided on a display of a user's device during a scanning process and may include, for example, pass through view images or views of a 3D model as described with respect to FIG. 5. In this example, the representation 1000 is a view of the 3D model. In this example, based on input, e.g., a user manually identifying a portion of a representation 1000 (e.g., a view of the 3D model), information about the particular identified portion is provided, e.g., portion-specific information is shown based on the user selecting a particular portion.

Figure 11:
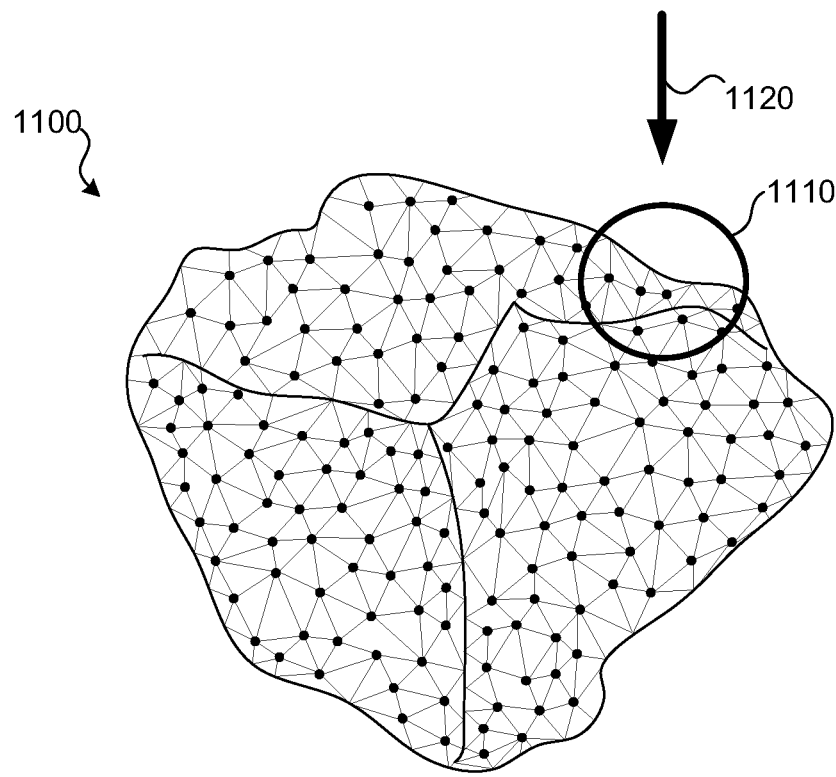
FIG. 11 illustrates an example of coverage-based guidance in accordance with some implementations.

FIG. 11 illustrates an example of coverage-based guidance. In this example, the representation 1100 is provided on a display of a user's device during a scanning process and may include, for example, pass through view images or views of a 3D model as described with respect to FIG. 5. In this example, the representation 1100 is a view of the 3D model. In this example, a guidance indicator 1120 and portion indicator 1110 are provided. The guidance indicator 1120 is an arrow and the portion indicator 1110 is a circle that together remind the user to scan the particular portion of the object identified by the locations of the guidance indicator 1120 and portion indicator 1110.

Figure 12:
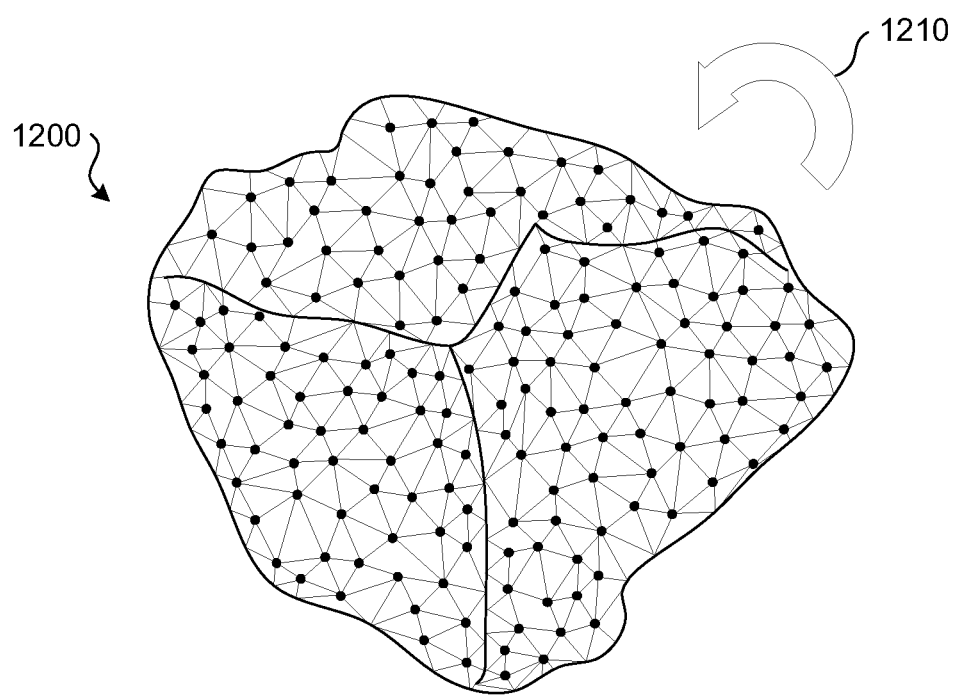
FIG. 12 illustrates an example of coverage-based guidance in accordance with some implementations.

FIG. 12 illustrates an example of coverage-based guidance. In this example, the representation 1200 is provided on a display of a user's device during a scanning process and may include, for example, pass through view images or views of a 3D model as described with respect to FIG. 5. In this example, the representation 1200 is a view of the 3D model. In this example, indicator 1210 indicates that a relatively large area of the object does not have adequate coverage yet and graphically indicates the location of that area or how the device should be moved relative to the object to capture that area.

In some implementations, the feedback includes recommendations for manually capturing/identifying sets of sensor data (e.g., shots) for use in generating the final 3D model. For example, the device 110 may display a recommendation to capture a set of sensor data (e.g., a shot) in the proximity of a current location or provide an indication of where to move the device to capture such a set of sensor data. In one example, a blinking camera icon is displayed to indicate a recommendation to capture the current set of sensor data, e.g., to identify the current image and associated depth data as a shot for use in generating the final 3D model.

In some implementations, the feedback includes recommendations regarding repositioning or reorienting the device to improve the coverage of the captured sensor data. For example, an arrow indicator may be displayed based on detecting that the current camera position and/or orientation is not providing images of the entire object and/or too far from or too close to the object.

In some implementations, the feedback is based on using the current coverage (e.g., coverage values) to determine a next-best-location-to-capture guidance. Examples of such guidance are illustrated in FIGS. 11-12. In some implementations, while the device is showing a preview/video frames of the object (or 3D model of the object), a coverage module may compute (e.g., in real-time) the "coverage contribution" of the frame if the user were to manually capture/identify a set of sensor data (e.g., a shot) for use in generating the final 3D model from that location associated with the preview/video frame's camera location. Such real-time feedback could help users decide where to take their next shot. For example, as the user moves the camera around amongst various potential shot locations, the real-time contribution identifying an amount of coverage contribution (e.g., a number or percentage corresponding to a relative amount contribution) could enable the user to observe and compare the contributions of capturing shots from various viewpoint regions and then select to take shots in appropriate circumstances, e.g., when the identified feedback is relatively high. The feedback may help the user select when and where to capture shots that best contribute to the coverage.

Figure 13:
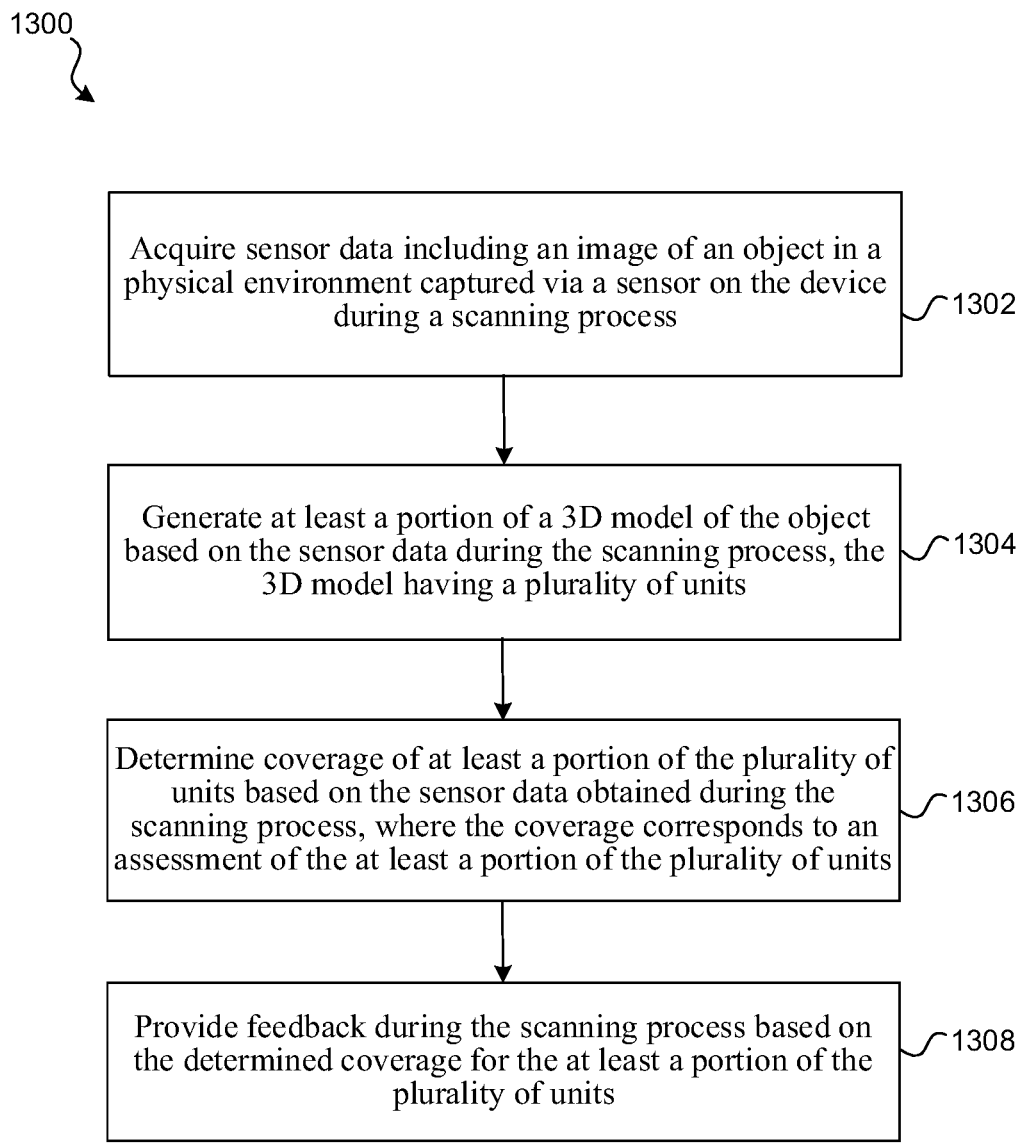
FIG. 13 is a flowchart illustrating a method for providing feedback based on coverage during an object scanning process in accordance with some implementations.

FIG. 13 is a flowchart illustrating a method for providing feedback based on coverage during an object scanning process. In some implementations, a device such as electronic device 110 performs method 1300. In some implementations, method 1300 is performed on a mobile device, desktop, laptop, HMD, or server device. The method 1300 is performed by processing logic, including hardware, firmware, software, or a combination thereof. In some implementations, the method 1300 is performed on a processor executing code stored in a non-transitory computer-readable medium (e.g., a memory).

At block 1302, the method 1300 acquires sensor data including an image of an object in a physical environment captured via a sensor on the device during a scanning process. The sensor data includes images of a physical environment captured via a camera on the device. The sensor data may include RGB images, black and white images, grey-scale images, depth sensor data (e.g, LIDAR, time-of-flight, etc.), depth sensor images (e.g., depth data correlated with pixel positions), densified depth data, device movement data (e.g., accelerometer data, gyroscope data, etc), ambient light sensor data, and/or any other type of sensor data useful in generating a 3D model and/or determining coverage.

At block 1304, the method 1300 generates at least a portion of a 3D model (e.g., a coarse representation such as a voxel mesh) of the object based on the sensor data during the scanning process, the 3D model comprising a plurality of units. The 3D model includes a plurality of units (e.g., voxels, points, etc.), which may correspond to surface portions of the object being scanned. The 3D model may include additional information such as information about the color, texture, surface normal, or other characteristics of the respective portions of the 3D model determined based on the sensor data.

At block 1306, the method 1300 determines coverage of at least a portion of the plurality of units based on the sensor data obtained during the scanning process, wherein the coverage corresponds to an assessment of the at least a portion of the plurality of units. The coverage provides an assessment of how well each portion (e.g. voxel) represents or otherwise provides useful data with respect to generating a 3D reconstruction of the object. The coverage of the plurality of units may be determined based on assessing how well each of the plurality of units represents the object for purposes of accurately reconstructing the object via a 3D model. Non-limiting examples of various factors useful in assessing coverage, for example, by determining coverage values are described below.

At block 1308, the method 1300 provides feedback during the scanning process based on the determined coverage for the at least a portion of the plurality of units. The feedback may include any of the features illustrated in FIGS. 5-12. The feedback may include a video preview of the object or 3D model, wherein display characteristics (e.g., color, glow, brightness, or sugar coating) of the plurality of units of the 3D model are determined based on the determined coverage. The feedback may include a heat map distinguishing the portions of the plurality of units based on the determined coverage. The coverage of the plurality of units may be determined based on sensor characteristics, e.g., pose, sensor intrinsics, etc.

The method 1300 may include selecting a subset of the sensor data (e.g., captured images and associated depth data) based on the coverage and generating a second (e.g., final) 3D model of the object based on the selected subset of the sensor data. The second 3D model includes smaller portions than the 3D model generated during the movement of the device. For example, the first (e.g., live) 3D model may be a voxel model that is coarser than the final 3D model that is generated after the scanning process is completed. The greater detail in the final 3D model may be achieved by using more time and computing resources than were available or during the live scanning process.

Exemplary Factors and Techniques for Determining Coverage

Coverage may be determining based on assessing the sensor data with respect to providing data for each of the plurality of units. The sensor data may be assessed based on distance between an image sensor and each respective portion of the plurality of units. The sensor data may be assessed based on incidence angle between an image sensor view direction and surface normal of each respective portion of the plurality of units. The sensor data may be assessed based on assessing each respective portion of the plurality of units with respect to an image plane center. The sensor data may be assessed based on assessing each respective portion of the plurality of units with respect to capture by uniformly distributed sensor poses. The sensor data may be assessed based on assessing each respective portion of the plurality of units with respect to capture by a sensor.

The following exemplary coverage algorithm is provided as an example. Alternative techniques may be used to determine coverage as described herein. In this example, the following intuitions and factors are used:

(a) A 3D point is determined to be covered better if the incident angle between its surface normal and camera view direction is smaller. The following notation is used: $\text{inner\_prod}(\theta) = v \cdot n_p$. Considering potential noises to the estimated normals, a margin is added for the inner product: $\text{inner\_prod}_{\theta_0}(\theta) = (v \cdot n_p) 1_{v \cdot n_p} >= \cos \theta_0$. Note that alternative denoising techniques may be used. For example, denoising may involve using a quantization of the incident angle/inner product into several bins, where all angles/inner products in the same bin take the same (e.g., average) value. Another method is to use a power or exponential with the inner product, such as $<v, n_p>^\alpha$, or $\exp(-\alpha^* <v, n_p>)$, where $\alpha$ is a tuning parameter. This method can amplify the difference in the incident angles and/or inner products.

(b) A 3D point is covered better if its projection in the camera plane is closer to the plane center. The following notation is used r (normalized distance to image plane center). The radial distortion polynomial is used to characterize the impact: $1 + k_1 r^2$.

(c) A 3D point is covered better if its distance to the camera center is within the focus distance region of the camera. If the distance is smaller or larger (i.e., outside) the focus distance region of the camera, the coverage score will be penalized. The following notation is used: $l_{scaled}$, a scaled distance factor reflecting the above requirement. A model is used to compute $l_{scaled}$. Let the auto-focus (absolute) distance range be [$l_{af,min}$, $l_{af,max}$]. A Huber loss is employed for the distance factor, i.e. [$l_{af,min}$, $l_{af,max}$] is a quadratic function within, and linear outside [$l_{af,min}$, $l_{af,max}$] The requirement for the Huber loss include: (i) continuous and first-order continuous; (ii) parabola facing up; (iii) the minimum value is 1.0 (iv) the minimum value is achieved at a distance $l_c \in (l_{af,min}, (l_{af,min}, l_{af,max})/2)$ (favoring shorter distance within the auto-focus region); and (v) the value at the boundary $l_{af,max}$ is 2.0 (subject to change).

(d) Net contribution of a new set of sensor data (e.g., camera shot) to a 3D point compared to the prior ones: One example uses a "closest-distance-thresholding" method. If the new sensor data (e.g., camera shot) is close to any of the prior ones, its contribution to coverage is discounted. This may be measured by a global discount factor, w. An algorithm may be used to compute w. Let the camera center locations of the visible camera shots to 3D point p prior to the shot c be $c_0, c_1, \ldots, c_{n_p-1}$. Let the camera center of shot c be $c_c$. The distance between $c_c$ to the nearest prior camera center in the above list: $w_c = \min\{1, (d_{min}/\bar{d})\}$. Here $\bar{d}$ is a preset baseline distance threshold to take discount. Alternatively to using "closest-distance-thresholding," other techniques may be used to compute the contribution discount factor w. For example, the contribution discount factor w may be computed based on the contribution of the new shot c to the distribution uniformity of all the visible camera shots, $c_0, c_1, \ldots, c_{n_p-1}$, c (including the new shot c and all the prior visible camera shots to the e.g. voxel). The distribution uniformity of a set of camera shots/view directions can be characterized, for example, by some parameter(s) of a statistical distribution of directional vectors. One example is the κ parameter in the "von Mises-Fisher distribution" of unit vectors on a (hemi)sphere. Using the κ as an example, to characterize the net contribution of the new camera shot c to the κ change for the set of visible camera shots to the e.g. voxel, the discount factor $w_c$ can be set to equal $f(\kappa_i; \kappa_{i-1})$, where "$\kappa_{i-1}$" is the old κ before adding the new camera shot c, i.e., evaluated on the prior shots $c_0, c_1, \ldots, c_{n_p-1}$ only; while $\kappa_i$ is the new κ after adding the new camera shot c, i.e., evaluated on the new set of shots $c_0, c_1, \ldots, c_{n_p-1}$, and f(,) is a function depending on $\kappa_i$, $\kappa_{i-1}$, and their differences.

The complete model may involve the following. Given a camera shot and a 3D point visible by the camera shot, the contribution on coverage of the camera shot to the point is defined as $$\text{Covereage}(p, c) = kw_c^2 \max\{\frac{\text{inner\_prod}_{\theta_0}(\theta)}{l_{scaled,c} \times (1 + k_1 r_c^2)} - b, 0\}$$

Note that $\theta_0$ is incident angle threshold, $k_1$ is a normalized distance magnifying coefficient, factor term k and intersect term b are to normalize the Coverage(p,c) term in [0, 1], and $w_c$ is squared to make the discount effect more significant.

The 3D point p's total coverage score is:

$$\text{Covereage}(p) = \sum_{i=0}^{N_p-1} \text{Covereage}(p, c_i)$$

Here $N_p$ is the total number of camera shots that cover node p, and the addition is in the order of the camera shots being taken, because it affects the respective discount factors $w_{ci}$.

The following is a numerical example in which $\theta_0 = \pi/3$, $k_1 = 0.25$. In this example:
 (1) $w_c \in [0, 1]$ (by definition)
 2. $l_{scaled} \in [1, 2]$, ($l \in [l_{af,min}, l_{af,max}]$) (the upper bound 2 is also tunable, only the auto focus range is considered)
 3. inner_prod$_{\theta_0}(\theta) \in [0.5, 1]$, ($\theta \in [0, \theta_0 = \pi/3]$)
 4. $1 + k_1 r_c^2 \in [1, 1.25]$, ($k_1 = 0.25$, $r_c \in [0, 1]$)
Given this, b and k are computed as: b=0.5/(2×1.25)=0.2, k=1/0.8=1.25, this makes Coverage(p, c) ∈ [0, 1].

A coverage score for a camera shot and a camera shot sequence may be calculated. From the above unified model, a coverage score for a camera shot may be derived as the sum of (marginal) coverage score of all 3D points covered by the camera shot:

$$\text{Covereage}(c) = \sum_{p: p \in c} \text{Covereage}(p, c_i)$$

Given the discount parameter $w_c$, the value of each Coverage(p, c) depends on the prior camera shots preceding this camera shot. The coverage score of a sequence of ordered camera shots $c_0, c_1, \ldots, c_{n-1}$ may be defined as:

$$\text{Covereage}(\{c_0, c_1, \ldots, c_{N-1}\}) = \frac{1}{N} \sum_{i=0}^{N-1} \text{Covereage}(c_i)$$

In the definition of Coverage(c), the average is not taken as the more points covered by the camera shot, the camera shot has a higher coverage score.

Figure 14:
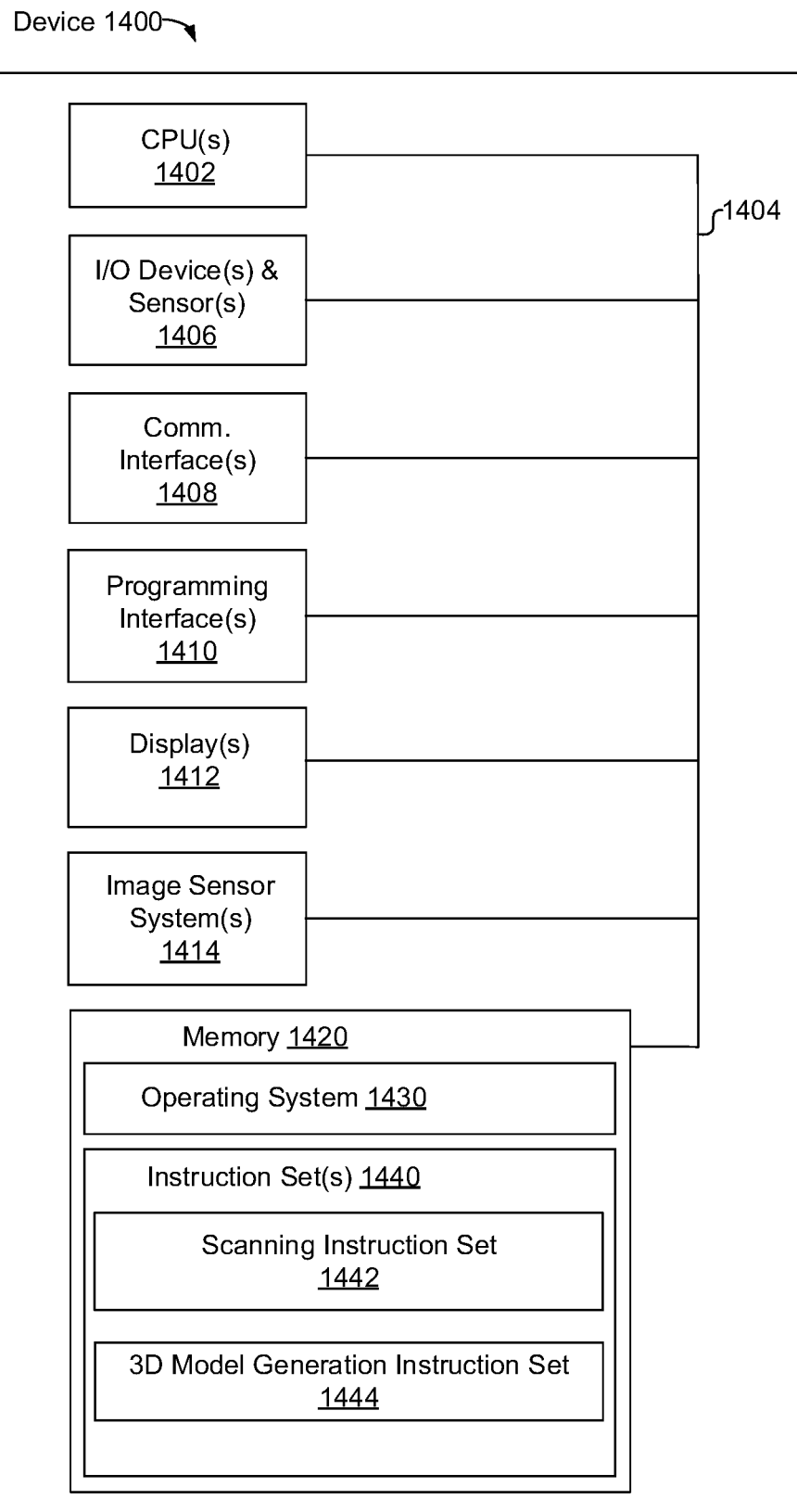
FIG. 14 is a block diagram of an electronic device of in accordance with some implementations.

FIG. 14 is a block diagram of electronic device 1400. Device 1400 illustrates an exemplary device configuration for electronic device 110. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 1400 includes one or more processing units 1402 (e.g., microprocessors, ASICs, FPGAs, GPUs, CPUs, processing cores, and/or the like), one or more input/output (I/O) devices and sensors 1406, one or more communication interfaces 1408 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 1410, one or more output device(s) 1412, one or more interior and/or exterior facing image sensor systems 1414, a memory 1420, and one or more communication buses 1404 for interconnecting these and various other components.

In some implementations, the one or more communication buses 1404 include circuitry that interconnects and controls communications between system components. In some implementations, the one or more I/O devices and sensors 1406 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more output device(s) 1412 include one or more displays configured to present a view of a 3D environment to the user. In some implementations, the one or more displays 1412 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), and/or the like display types. In some implementations, the one or more displays correspond to diffractive, reflective, polarized, holographic, etc. waveguide displays. In one example, the device 1400 includes a single display. In another example, the device 1400 includes a display for each eye of the user.

In some implementations, the one or more output device(s) 1412 include one or more audio producing devices. In some implementations, the one or more output device(s) 1412 include one or more speakers, surround sound speakers, speaker-arrays, or headphones that are used to produce spatialized sound, e.g., 3D audio effects. Such devices may virtually place sound sources in a 3D environment, including behind, above, or below one or more listeners. Generating spatialized sound may involve transforming sound waves (e.g., using head-related transfer function (HRTF), reverberation, or cancellation techniques) to mimic natural soundwaves (including reflections from walls and floors), which emanate from one or more points in a 3D environment. Spatialized sound may trick the listener's brain into interpreting sounds as if the sounds occurred at the point(s) in the 3D environment (e.g., from one or more particular sound sources) even though the actual sounds may be produced by speakers in other locations. The one or more output device(s) 1412 may additionally or alternatively be configured to generate haptics.

In some implementations, the one or more image sensor systems 1414 are configured to obtain image data that corresponds to at least a portion of a physical environment. For example, the one or more image sensor systems 1414 may include one or more RGB cameras (e.g., with a complimentary metal-oxide-semiconductor (CMOS) image sensor or a charge-coupled device (CCD) image sensor), monochrome cameras, IR cameras, depth cameras, event-based cameras, and/or the like. In various implementations, the one or more image sensor systems 1414 further include illumination sources that emit light, such as a flash. In various implementations, the one or more image sensor systems 1414 further include an on-camera image signal processor (ISP) configured to execute a plurality of processing operations on the image data.

The memory 1420 includes high-speed random-access memory, such as DRAM, SRAM, DDR RAM, or other random-access solid-state memory devices. In some implementations, the memory 1420 includes non-volatile memory, such as one or more magnetic disk storage devices, optical disk storage devices, flash memory devices, or other non-volatile solid-state storage devices. The memory 1420 optionally includes one or more storage devices remotely located from the one or more processing units 1402. The memory 1420 comprises a non-transitory computer readable storage medium.

In some implementations, the memory 1420 or the non-transitory computer readable storage medium of the memory 1420 stores an optional operating system 1430 and one or more instruction set(s) 1440. The operating system 1430 includes procedures for handling various basic system services and for performing hardware dependent tasks. In some implementations, the instruction set(s) 1440 include executable software defined by binary information stored in the form of electrical charge. In some implementations, the instruction set(s) 1440 are software that is executable by the one or more processing units 1402 to carry out one or more of the techniques described herein.

The instruction set(s) 1440 include a scanning instruction set 1442 configured to, upon execution, obtain sensor data, provide views/representations, provide feedback, and/or select sets of sensor data as described herein. The instruction set(s) 1440 further include a 3D model generation instruction set 1444 configured to, upon execution, generate 3D models as described herein. The instruction set(s) 1440 may be embodied as a single software executable or multiple software executables.

Although the instruction set(s) 1440 are shown as residing on a single device, it should be understood that in other implementations, any combination of the elements may be located in separate computing devices. Moreover, the figure is intended more as functional description of the various features which are present in a particular implementation as opposed to a structural schematic of the implementations described herein. As recognized by those of ordinary skill in the art, items shown separately could be combined and some items could be separated. The actual number of instructions sets and how features are allocated among them may vary from one implementation to another and may depend in part on the particular combination of hardware, software, and/or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

As described above, one aspect of the present technology is the gathering and use of sensor data that may include user data to improve a user's experience of an electronic device. The present disclosure contemplates that in some instances, this gathered data may include personal information data that uniquely identifies a specific person or can be used to identify interests, traits, or tendencies of a specific person. Such personal information data can include movement data, physiological data, demographic data, location-based data, telephone numbers, email addresses, home addresses, device characteristics of personal devices, or any other personal information.

The present disclosure recognizes that the use of such personal information data, in the present technology, can be used to the benefit of users. For example, the personal information data can be used to improve the content viewing experience. Accordingly, use of such personal information data may enable calculated control of the electronic device. Further, other uses for personal information data that benefit the user are also contemplated by the present disclosure.

The present disclosure further contemplates that the entities responsible for the collection, analysis, disclosure, transfer, storage, or other use of such personal information and/or physiological data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates implementations in which users selectively block the use of, or access to, personal information data. That is, the present disclosure contemplates that hardware or software elements can be provided to prevent or block access to such personal information data. For example, in the case of user-tailored content delivery services, the present technology can be configured to allow users to select to "opt in" or "opt out" of participation in the collection of personal information data during registration for services. In another example, users can select not to provide personal information data for targeted content delivery services. In yet another example, users can select to not provide personal information, but permit the transfer of anonymous information for the purpose of improving the functioning of the device.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences or settings based on non-personal information data or a bare minimum amount of personal information, such as the content being requested by the device associated with a user, other non-personal information available to the content delivery services, or publicly available information.

In some embodiments, data is stored using a public/private key system that only allows the owner of the data to decrypt the stored data. In some other implementations, the data may be stored anonymously (e.g., without identifying and/or personal information about the user, such as a legal name, username, time and location data, or the like). In this way, other users, hackers, or third parties cannot determine the identity of the user associated with the stored data. In some implementations, a user may access their stored data from a user device that is different than the one used to upload the stored data. In these instances, the user may be required to provide login credentials to access their stored data.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
at a device having a processor:
acquiring sensor data comprising an image of an object in a physical environment captured via a sensor on the device during a scanning process;
generating at least a portion of a three-dimensional (3D) model of the object based on the sensor data during the scanning process, the 3D model comprising a plurality of units;
determining coverage of at least a portion of the plurality of units based on the sensor data obtained during the scanning process, wherein the coverage corresponds to an assessment of adequacy of the sensor data corresponding to each of the at least a portion of the plurality of 3D units for purposes of accurately reconstructing the object, wherein coverage scores for individual 3D units are compared to a threshold coverage score; and
providing feedback during the scanning process based on the determined coverage for the at least a portion of the plurality of units.

2. The method of claim 1 further comprising:
selecting a subset of the sensor data based on the coverage; and
generating a second 3D model of the object based on the selected subset of the sensor data, wherein the second 3D model includes smaller portions than the 3D model generated during the scanning process.

3. The method of claim 1, wherein the 3D model is a voxel-based representation.

4. The method of claim 1, wherein the feedback comprises a video preview of the 3D model, wherein display characteristics of the plurality of units of the 3D model are determined based on the determined coverage.

5. The method of claim 1, wherein providing feedback during the scanning process comprises presenting a heat map distinguishing the units of the plurality of units based on the determined coverage.

6. The method of claim 1, wherein the sensor data includes depth data and light intensity image data.

7. The method of claim 1, wherein the coverage of the plurality of units is determined based on sensor characteristics.

8. The method of claim 1, wherein the coverage is determined based on assessing the sensor data with respect to providing data for each of the plurality of units, wherein the sensor data is assessed based on a distance between an image sensor and each respective portion of the plurality of units.

9. The method of claim 1, wherein the coverage is determined based on assessing the sensor data with respect to providing data for each of the plurality of units, wherein the sensor data is assessed based on incidence angle between an image sensor view direction and surface normal of each respective portion of the plurality of units.

10. The method of claim 1, wherein the coverage is determined based on assessing the sensor data with respect to providing data for each of the plurality of units, wherein the sensor data is assessed based on assessing each respective portion of the plurality of units with respect to an image plane center.

11. The method of claim 1, wherein the coverage is determined based on assessing the sensor data with respect to providing data for each of the plurality of units, wherein the sensor data is assessed based on assessing each respective portion of the plurality of units with respect to capture by uniformly distributed sensor poses.

12. The method of claim 1, wherein the coverage is determined based on assessing the sensor data with respect to providing data for each of the plurality of units, wherein the sensor data is assessed based on assessing each respective portion of the plurality of units with respect to capture by a sensor.

13. The method of claim 1, wherein the sensor data is obtained during movement of the device in a physical environment comprising the object.

14. The method of claim 1, wherein the image comprises an RGB image or a depth image.

15. The method of claim 1, wherein the feedback graphically distinguishes 3D units based on differing amounts of coverage, 3D units associated with different coverage values represented by graphical indicators having differing display characteristics indicative of adequacy of coverage.

16. The method of claim 1, wherein the coverage scores are assigned on a scale from a minimum value to a maximum value, and the threshold coverage score is between the minimum value and the maximum value.

17. A system comprising:
a non-transitory computer-readable storage medium; and
one or more processors coupled to the non-transitory computer-readable storage medium, wherein the non-transitory computer-readable storage medium comprises program instructions that, when executed on the one or more processors, cause the system to perform operations comprising:
acquiring sensor data comprising an image of an object in a physical environment captured via a sensor on a device during a scanning process;
generating at least a portion of a three-dimensional (3D) model of the object based on the sensor data during the scanning process, the 3D model comprising a plurality of units;
determining coverage of at least a portion of the plurality of units based on the sensor data obtained during the scanning process, wherein the coverage corresponds to an assessment of adequacy of the sensor data corresponding to each of the at least a portion of the plurality of 3D units for purposes of accurately reconstructing the object, wherein coverage scores for individual 3D units are compared to a threshold coverage score; and providing feedback during the scanning process based on the determined coverage for the at least a portion of the plurality of units.

18. The system of claim 17, wherein the operations further comprise:

selecting a subset of the sensor data based on the coverage; and generating a second 3D model of the object based on the selected subset of the sensor data, wherein the second 3D model includes smaller portions than the 3D model generated during movement of a device.

19. The system of claim 17, wherein the sensor data includes depth data and light intensity image data.

20. A non-transitory computer-readable storage medium storing program instructions executable via one or more processors to perform operations comprising:

acquiring sensor data comprising an image of an object in a physical environment captured via a sensor on the device during a scanning process;

generating at least a portion of a three-dimensional (3D) model of the object based on the sensor data during the scanning process, the 3D model comprising a plurality of units;

determining coverage of at least a portion of the plurality of units based on the sensor data obtained during the scanning process, wherein the coverage corresponds to an assessment of adequacy of the sensor data corresponding to each of the at least a portion of the plurality of 3D units for purposes of accurately reconstructing the object, wherein coverage scores for individual 3D units are compared to a threshold coverage score; and providing feedback during the scanning process based on the determined coverage for the at least a portion of the plurality of units.

21. A method comprising:

at a device having a processor:

acquiring sensor data comprising an image of an object in a physical environment captured via a sensor on the device during a scanning process;

generating at least a portion of a three-dimensional (3D) model of the object based on the sensor data during the scanning process, the 3D model comprising a plurality of 3D units;

determining coverage of at least a portion of the plurality of 3D units based on the sensor data obtained during the scanning process, wherein the coverage corresponds to an assessment of the at least a portion of the plurality of 3D units; and providing feedback during the scanning process based on the determined coverage for the at least a portion of the plurality of 3D units, wherein the feedback comprises a preview of the 3D model overlain on a live image of the object with display characteristics of the 3D units of the previewed 3D model based on the coverage.

22. The method of claim 21, wherein the display characteristics of the 3D units being based on the coverage comprises the 3D units associated with different coverage values being represented by graphical indicators having differing display characteristics indicative of differing adequacy of coverage.

* * * * *